(12) United States Patent
Austin

(10) Patent No.: US 8,689,261 B2
(45) Date of Patent: *Apr. 1, 2014

(54) SYSTEM AND METHOD FOR INTEGRATING USER-SELECTED DATA WITH DISPLAYED VIDEO CONTENT

(75) Inventor: Jarrod C. Austin, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,187

(22) Filed: Sep. 14, 2012

(65) Prior Publication Data

US 2013/0014168 A1    Jan. 10, 2013

Related U.S. Application Data

(63) Continuation of application No. 12/511,164, filed on Jul. 29, 2009, now Pat. No. 8,272,012.

(51) Int. Cl.
*H04N 5/445* (2011.01)
*G06F 3/048* (2013.01)

(52) U.S. Cl.
USPC .............................. 725/47; 348/564; 715/790

(58) Field of Classification Search
USPC .............................. 725/47; 348/564; 715/790
See application file for complete search history.

(56) References Cited

U.S. PATENT DOCUMENTS

| | | | |
|---|---|---|---|
| 7,197,715 B1 | 3/2007 | Valeria | |
| 2004/0078814 A1* | 4/2004 | Allen | 725/47 |
| 2004/0252238 A1 | 12/2004 | Park et al. | |
| 2008/0136899 A1 | 6/2008 | Eisenberg et al. | |
| 2009/0222754 A1 | 9/2009 | Phillips et al. | |
| 2009/0310020 A1 | 12/2009 | Vrijsen | |
| 2010/0049711 A1 | 2/2010 | Singh et al. | |

FOREIGN PATENT DOCUMENTS

| | | |
|---|---|---|
| CN | 1503554 A | 6/2004 |
| WO | 02067581 A1 | 8/2002 |
| WO | 2004006569 A1 | 1/2004 |

* cited by examiner

*Primary Examiner* — Hoang-Vu A Nguyen-Ba
(74) *Attorney, Agent, or Firm* — Lowe Graham Jones PLLC

(57) ABSTRACT

A video control system transfers a video signal to display a data/video integration menu and receives user instructions indicating user-selected data and display positioning for the user-selected data. The video control system transfers a data request and receives the user-selected data. The video control system receives video content. The video control system integrates the user-selected data and the video content into a video signal that positions the user-selected data relative to the video content according to the display positioning in the user instructions. The video control system transfers the video signal to display the integrated video content and user-selected data.

20 Claims, 6 Drawing Sheets

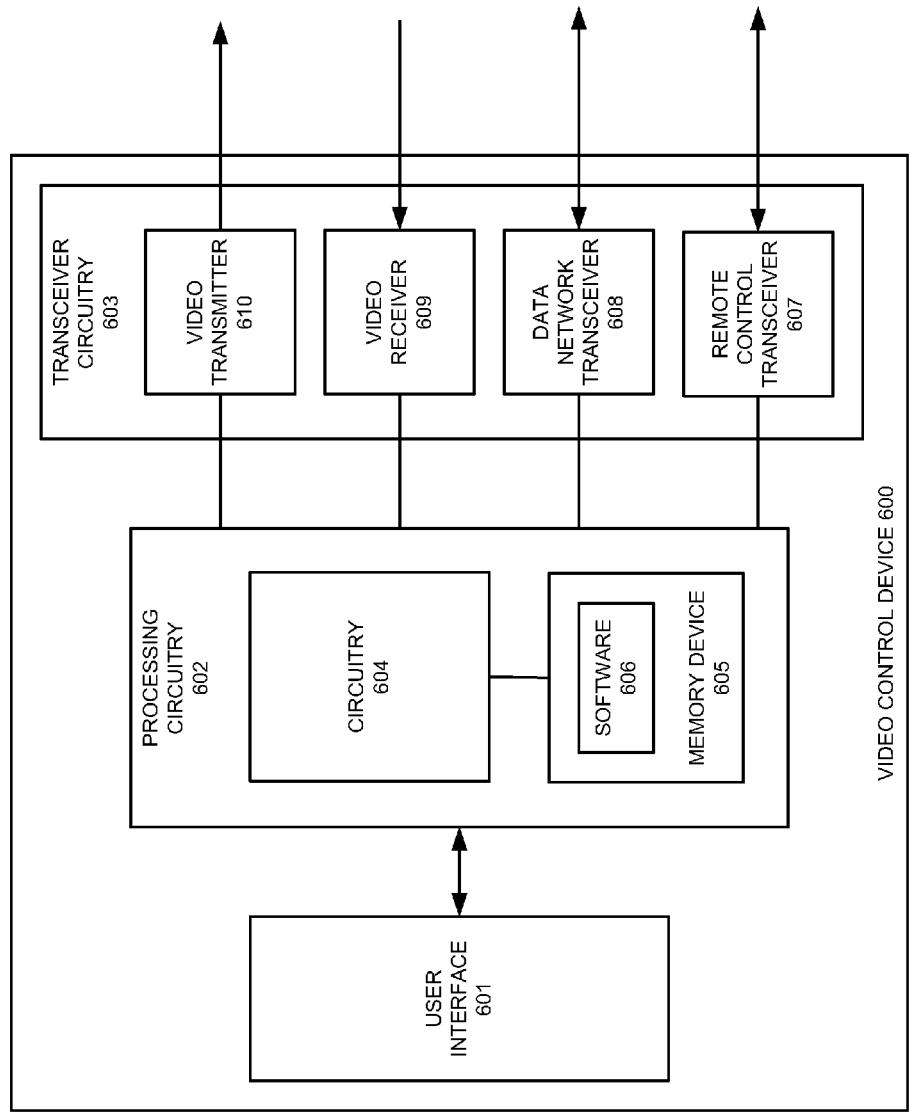

SYSTEM AND METHOD FOR INTEGRATING USER-SELECTED DATA WITH DISPLAYED VIDEO CONTENT

PRIORITY CLAIM

This patent application is a Continuation of U.S. Non-Provisional patent application Ser. No. 12/511,164, filed Jul. 29, 2009, published as U.S. Publication No. 2011/0030005, and entitled "USER-CONTROLLED DATA/VIDEO INTEGRATION BY A VIDEO CONTROL SYSTEM," the content of which is herein incorporated by reference in its entirety.

BACKGROUND

A video control system receives video content from a video service provider and transfers the video content to a display device, such as a television. The video content often contains data. For example, a video of a sporting event may include a box having the score and clock, and a news video may contain a crawl having news information. A crawl is typically a horizontal box that has text moving from right to left. This data is selected by the producer of the video.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 6 is a block diagram of a video control device according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
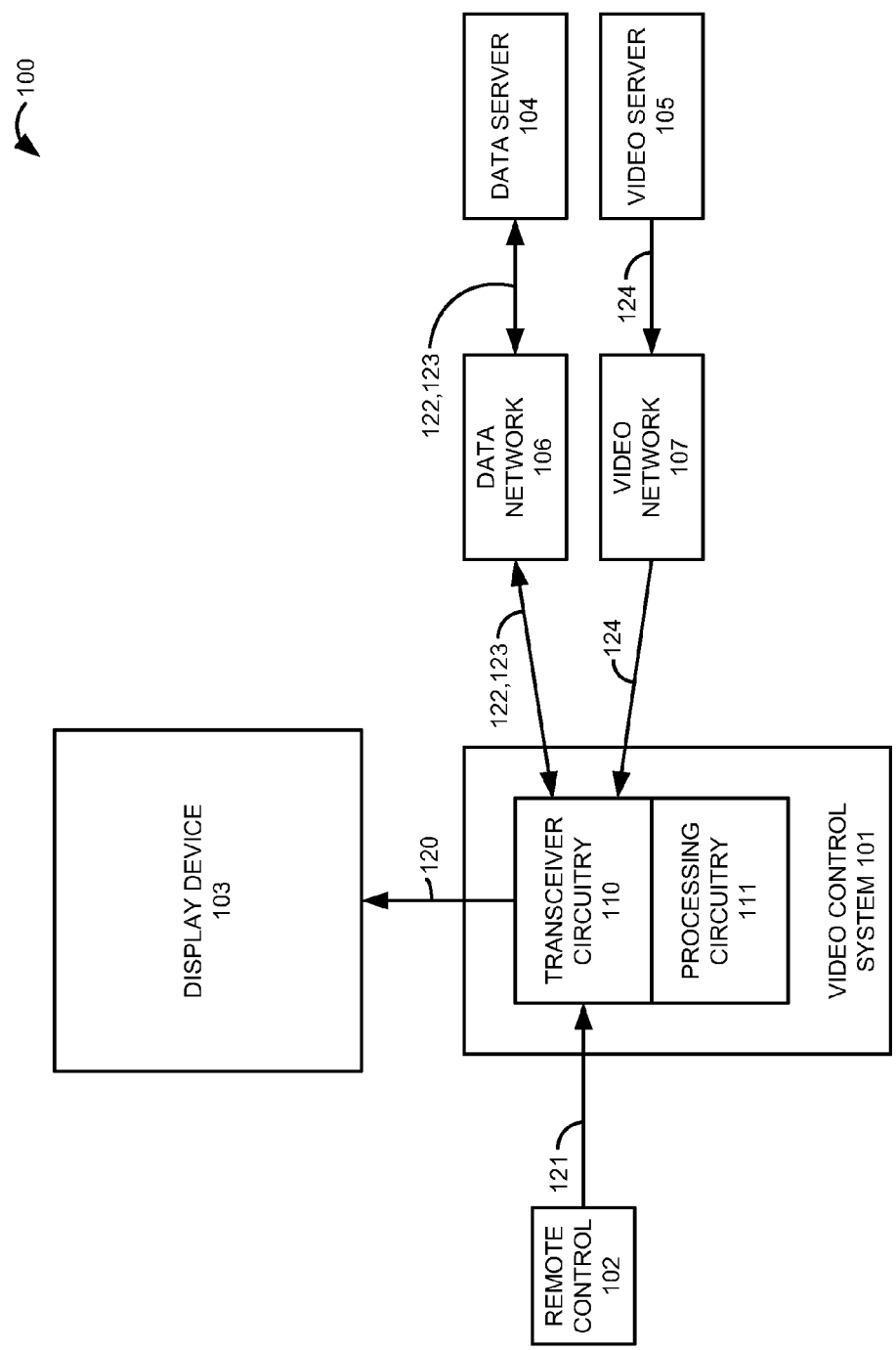
FIG. 1 is a simplified block diagram of a video control system and its operating environment according to an embodiment of the invention.

FIG. 1 illustrates video control system 101 and its operating environment 100. Video control system 101 comprises transceiver circuitry 110 and processing circuitry 111. Processing circuitry 111 forms video signal 120, and transceiver circuitry 110 transfers video signal 120 to display device 103. Video signal 120 drives display device 103 to graphically present video content, control menus, and data to the user. The user typically operates remote control 102 to control video control system 101.

Transceiver circuitry 110 receives user instructions 121 from remote control 102, where user instructions 121 indicate data selected by the user. Processing circuitry 111 processes user instructions 121 to generate data requests 122, and transceiver circuitry 110 transfers data requests 122 to data server 104 over data network 106. Data server 104 is loaded with data that is available for user selection. Transceiver circuitry 110 receives user-selected data 123 from data server 104 over data network 106. Transceiver circuitry 110 also receives video content 124 from video server 105 over video network 107.

User instructions 121 also indicate display positioning for the data relative to the video. Processing circuitry 111 processes user instructions 121, user-selected data 123, and video content 124 to form video signal 120. This version of video signal 120 drives display device 103 to display integrated video content and user-selected data where the user-selected data is positioned relative to the video content according to the display positioning in user instructions 121. Thus, the data is selected by the user and is integrated with the video at a position selected by the user.

Subsequently, data server 104 continues to transfer updated user-selected data 123 to video control system 101. Likewise, video server 105 continues to transfer new video content to video control system 101. Video control system 101 continues to integrate the updated user-selected data and the new video content using the display positioning selected by the user.

Display device 103 comprises a television, panel display, or some other graphic display device. Remote control 101 comprises a handheld electronic device for collecting user inputs and transferring corresponding user instructions 121. Data server 104 comprises a computer and communication system that is loaded with data available for selection by the user. Data network 106 comprises an internet-protocol network, telephone network, or some other communication system for transferring data—including combinations thereof. Video server 105 and video network 107 comprises a satellite video system, cable television system, optical fiber video system, wireless-access video system, Internet video system, or some other video content source—including combinations thereof.

Note some additional variations and clarifications. Remote control 121 could be omitted, and the user could directly enter user instructions 121 into video control system 101 through a user interface. Video control system 101 and display device 103 could be integrated together. Likewise, data network 106 and video network 107 could be integrated together. Data network 106 and video network 107 are depicted as individual networks, but they may comprise various combinations of communication networks and systems. Likewise, data server 104 and video server 105 and are depicted as individual servers, but they may comprise various combinations of servers and systems. Although not shown for clarity, there may be some conventional components between video control system 101 and networks 106-107, such as antennas, modems, communication links, and the like.

Figure 2:
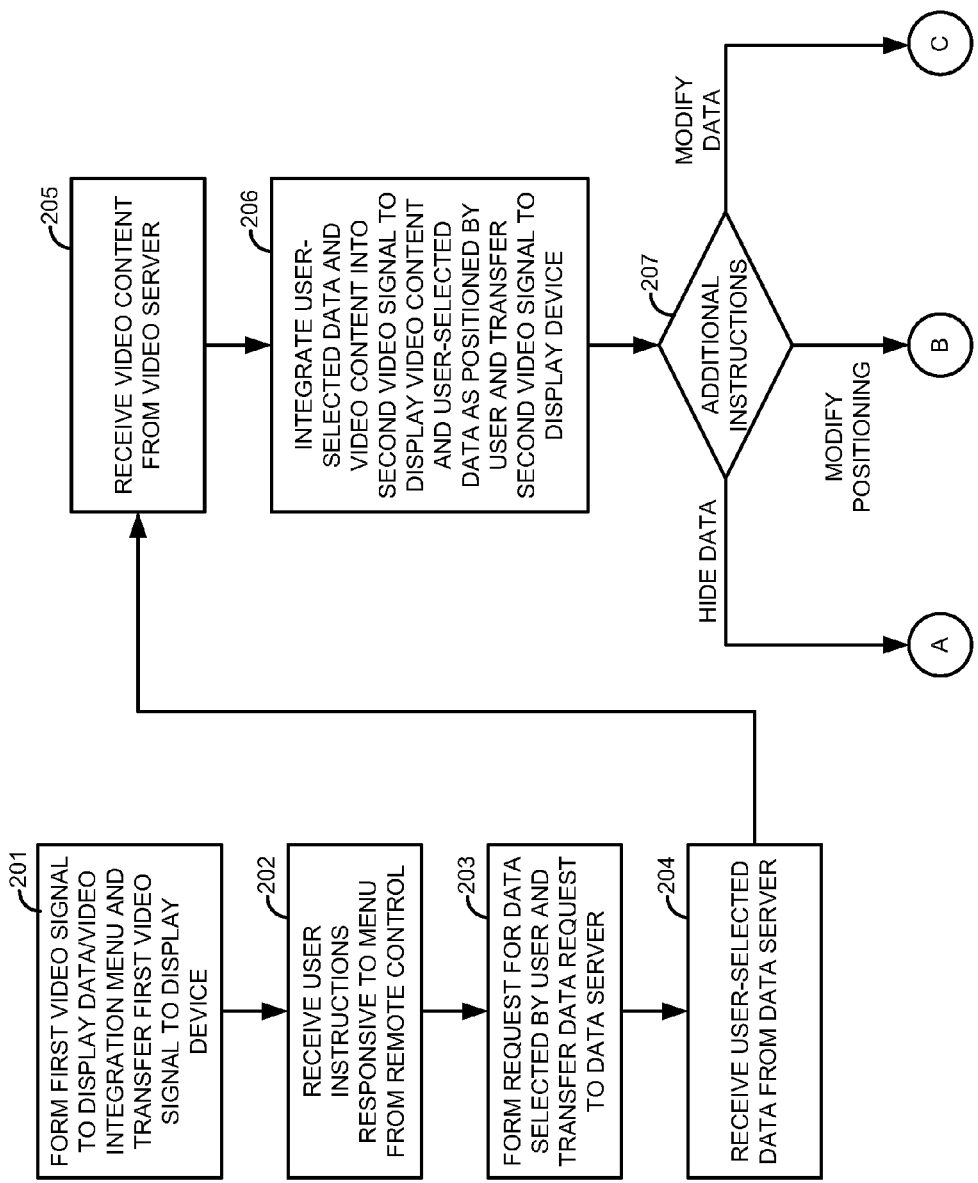
FIG. 2 is a flow diagram of a method of operating the video control system according to an embodiment of the invention.

FIG. 2 illustrates the operation of video control system 101. Processing circuitry 111 forms video signal 120 to drive display device 103 to display a data/video integration menu (201). Transceiver circuitry 110 transfers first video signal 120 to display device 103, and display device 103 displays the data/video integration menu (201). In response to the menu, transceiver circuitry 110 receives user instructions 121 from remote control 102 (202). User instructions 121 indicate data selected by the user and display positioning that indicates the location of the data relative to the video on the display screen.

In response to user instructions 121, processing circuitry 111 forms data request 122 for the data selected by the user (203). Transceiver circuitry 110 transfers data request 122 to data server 104 (203). Data server 104 is loaded with data corresponding to the data selections on the data/video integration menu. Transceiver circuitry 110 receives user-selected data 123 in response (204). Transceiver circuitry 110 also receives video content 124 (205). Processing circuitry 111 integrates user-selected data 123 and video content 124 into second video signal 120 that positions the user-selected data relative to the video content according to the display positioning in user instructions 121 (206). Transceiver circuitry 110 transfers second video signal 120 to display device 103, and display device 103 displays the integrated user-selected data and video content as positioned by the user (206).

Figure 3:
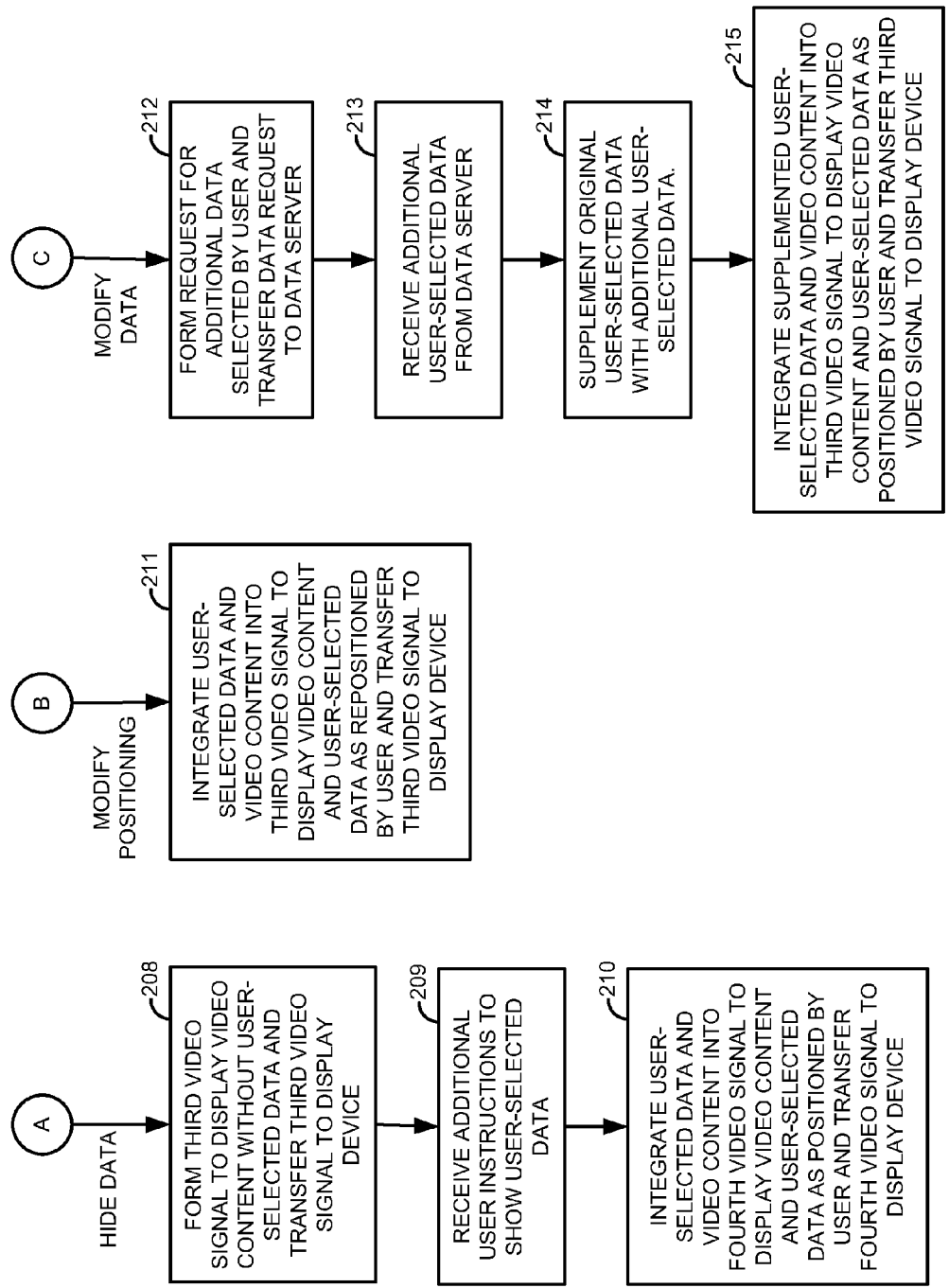
FIG. 3 is a flow diagram of a method of operating the video control system according to an embodiment of the invention.

Data server 104 continues to update the user-selected data, and video server 105 continues to transfer new video content. Video control system 101 continues to integrate the updated user-selected data and the new video using the display positioning selected by the user. During the display of the integrated video content and user-selected data, transceiver circuitry 110 may receive additional user instructions 121 from remote control 102 (207). There are various types of additional user instructions 121 that would trigger different operations. Three of these variations (A, B, C) are discussed below with respect to FIG. 3.

In one variation (A), the additional user instructions 121 are to hide the user-selected data. In response, processing circuitry 111 forms third video signal 120 to drive display device 103 to display the video content without the user-selected data (208). Transceiver circuitry 110 transfers third video signal 120 to display device 103, and display device 103 displays the video content without the user-selected data (208). Transceiver circuitry 110 then receives additional user instructions 121 to show the user-selected data (209). In response, processing circuitry 111 integrates the video content and user-selected data into fourth video signal 120 to drive display device 103 to display the user-selected data positioned relative to the video content according to the display positioning in user instructions 121 (210). Transceiver circuitry 110 transfers fourth video signal 120 to display device 103, and display device 103 displays the integrated video content and user-selected data as positioned by the user (210).

In another variation (B), the additional user instructions 121 are to modify the display positioning. In response, processing circuitry 111 integrates video content and user-selected data into third video signal 120 to drive display device 103 to display the user-selected data re-positioned relative to the video content according to the modified display positioning in additional user instructions 121 (211). Transceiver circuitry 110 transfers third video signal 120 to display device 103, and display device 103 displays the integrated video content and user-selected data as re-positioned by the user (211).

In another variation (C), the additional user instructions 121 are to modify the user-selected data. In response, processing circuitry 111 forms a request for the additional data selected by the user (212). Transceiver circuitry 110 transfers additional data request 122 to data server 104 (212) and receives the additional user-selected data 123 from data server 104 (213). Processing circuitry 111 supplements at least some of the original user-selected data with the additional user-selected data (214). Processing circuitry 111 integrates the supplemented user-selected data and the video content into third video signal 120 to drive display device 103 to display the video content and supplemented user-selected data with the supplemented user-selected data positioned relative to the video content according to the display positioning in user instructions 121 (215). Transceiver circuitry 110 transfers third video signal 120 to display device 103, and display device 103 displays the integrated video content and supplemented user-selected data as positioned by the user (215).

Figure 4:
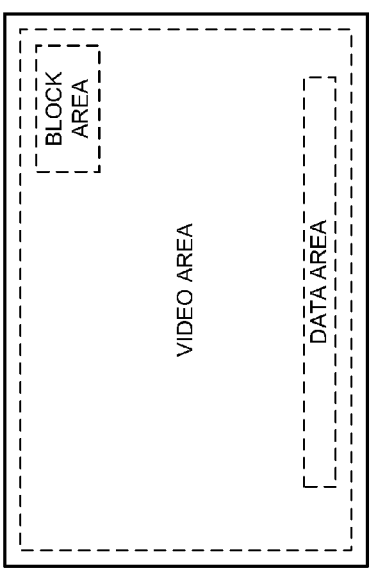
FIG. 4 is a sketch of a data/video integration menu according to an embodiment of the invention.

FIG. 4 illustrates data/video integration menu 400. Menu 400 is a specific example that is provided for illustrative principles, and alternative menu configurations could be used that allow the user to select data and to select the position of the data relative to the video. Boxes are provided to input a user name and to store individual user instruction sets as templates. Thus, individual users may create and store their own sets of user instructions for data/video integration.

Menu 400 includes a data selection comprising a linked set of pages—with only the top page shown on FIG. 4. By selecting a data type, such as "sports", a page listing various sports is provided. By selecting a sport, a page with various teams, events, and players for the sport link is provided. Ultimately a page with various scores and statistics is provided. For example, the user might select four football games to track the score and clock, and the user might select three players to track yards gained and points scored. The other data types would have similar linked pages to select various combinations of data types and specific data items. For example, the user-selected data could include stock prices for a handful of companies, horse racing results from two tracks, and a view of weather radar.

Menu 400 includes a screen format section. If "original" is selected, then the user-selected data will overlay the video. If "reduce for data" is selected, then the video screen size will automatically shrink (at the current aspect ratio) to create open space on the display for the user-selected data and avoid a data/video overlay. Thus, the user can select "reduce for data" and position data box in the open space. A selection of an aspect ratio also creates open space at the top/bottom or sides of the display for the user to place a data box or crawl and avoid the data/video overlay.

Menu 400 includes a data presentation section and a data/video positioning section. A selection of a data presentation item causes that item to be placed on the data/video positioning section. For example, if "crawl—regular font" is selected, then a crawl for regular font is placed in the data/video positioning section to allow user placement of the crawl relative to the video. Different types of crawls, boxes, and fonts are offered in the data presentation section. The data/video positioning section shows a video area as selected in the screen format section and a data area as selected in the data presentation section. The user may position the data area and/or the video area. For example, the user may drag a crawl to the bottom of the display or position a box at the top left corner of the display.

In the data presentation section, a selection of "block" causes a block area to be placed in the video area of the data/video positioning section. The block area covers that portion of the video so it cannot be seen by the user. The block could be black, white, or covered with a data area. The block allows the user to cover unwanted portions of the video content—like a crawl, score, or logo. For example, the user could block a crawl in the video and cover it with the user's own crawl having user-selected data.

Menu 400 includes an automatic section, so a particular template can be automatically used for a specific channel, program, or time. For example, the user might create a special template for their home town baseball team and automatically use it for their games. The user may customize a sports, news, and weather crawl to automatically use on a specific kids channel that their child often watches.

The top right of menu 400 has an "additional data selection", so the user can select and integrate more data onto the video display. For example, the user might first fill out the menu to establish a news and finance crawl, and then use "additional data selection" to add a box for select sports scores. "Apply" implements the menu selections. "Cancel" clears the menu.

While the user is viewing a video with integrated user-selected data, the user can access menu 400 to supplement the original user-selected data with additional user selected data—which might include deleting some of the original user-selected data. While the user is viewing a video with integrated user-selected data, the user can access menu 400 to modify the position of the user-selected data relative to the video.

Figure 5:
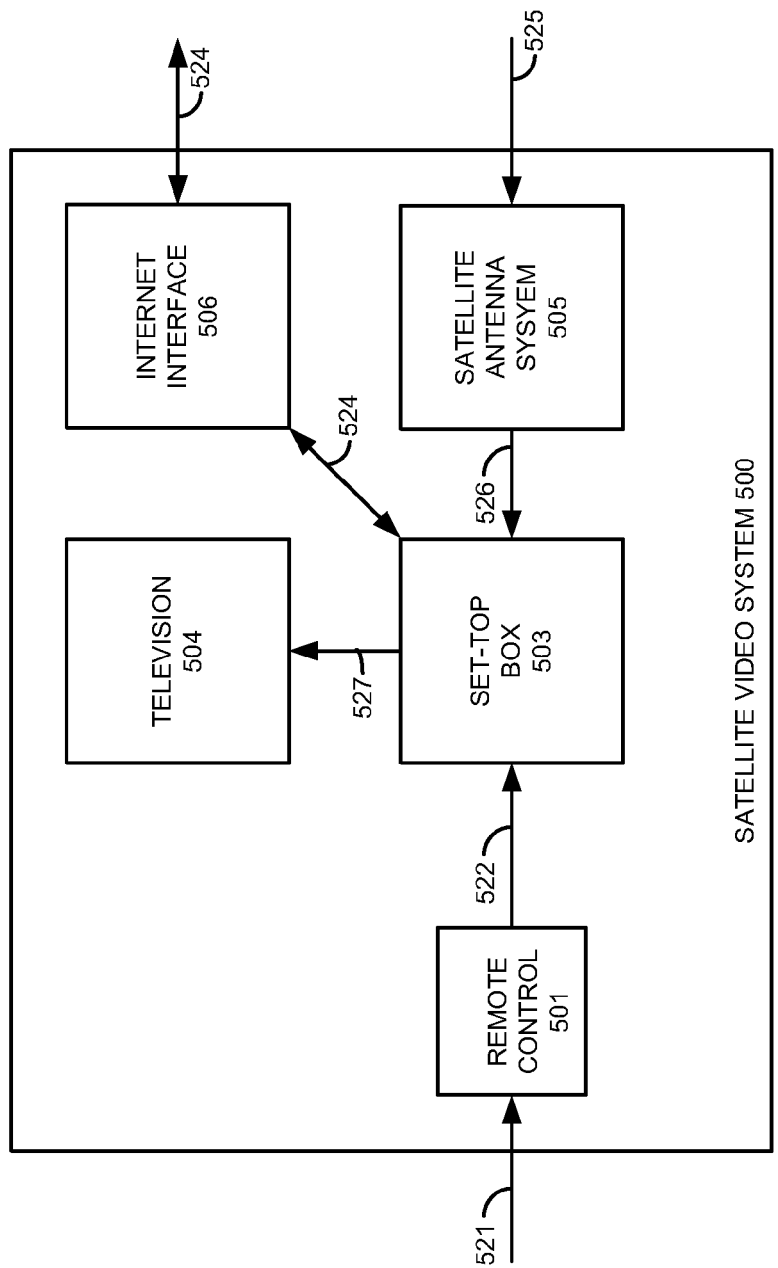
FIG. 5 is a block diagram of a satellite video system according to an embodiment of the invention.

FIG. 5 illustrates satellite video system 500. Satellite video system 500 comprises remote control 501, set-top box 503, television 504, satellite antenna system 505, and internet interface 506. Set-top box 503 is an example of video control system 101, although video control system 101 may use alternative configurations.

In operation, set-top box 503 transfers video signals 527 to television 504 to display data/video integration menu 400. Remote control 501 receives user inputs 521 responsive to menu 400 and transfers corresponding user instructions 522 to set-top box 503. User instructions 522 indicate data selections and display positioning for the selected data.

Responsive to user instructions 522, set-top box 503 transfers internet packets 524 requesting the user-selected data over internet interface 506 to a data server (not shown). The satellite video provider continually loads the data server with news, weather, sports, financial, and guide data that corresponds to the data choices on menu 400. The data server transfers internet packets 524 having the user selected data to set-top box 503 over internet interface 506.

Satellite antenna system 505 receives video content in satellite signal 525 and transfers video content 526 to set-top box 503. Set-top box 503 integrates the user-selected data and the video content as specified by the user on menu 400 to form video signal 527. Set-top box 503 transfers video signal 527 to television 504. Television 504 displays the user-selected data and the video content as specified on menu 400.

The data server continues to transfer internet packets 524 having updated user-selected data to set-top box 503. Satellite antenna system 505 continues to receive and transfer new video content 526 to set-top box 503. Set-top box 503 continues to integrate the updated user-selected data and the new video content as specified by the user on menu 400. Television 504 continues to display the updated user-selected data and the new video content as specified on menu 400. Set-top box 503 can hide the user-selected data, modify data position, and modify the selected data as described above. Set-top box 503 can block a crawl in the video content, cover a crawl in the video content with user selected data, and put user-selected data in open space created by reducing the screen size or changing the aspect ratio as described above.

FIG. 6 illustrates video control device 600. Video control device 600 is an example of video control system 101 and set-top box 503, although video control system 101 and set-top box 503 may use alternative configurations. Video control device 600 could be a set-top box, video game console, Internet appliance, or some other media device—including combinations thereof. Video control device 600 comprises user interface 601, processing circuitry 602, and transceiver circuitry 603. Processing circuitry 602 includes circuitry 604 and memory device 605 that stores operating software 606. Transceiver circuitry 603 comprises remote control transceiver 607, data network transceiver 608, video receiver 609, and video transmitter 610. Processing circuitry 602 is linked to components 607-610 in transceiver circuitry 603.

User interface 601 comprises components that interact with a user. User interface 602 may include keys, lights, display, dials, touchpad, or some other user input/output apparatus. User interface 601 may receive user instructions as described herein.

Remote control transceiver 607 comprises Radio Frequency (RF) communication circuitry and an antenna. The RF communication circuitry typically includes an amplifier, filter, RF modulator, and signal processing circuitry. Remote control transceiver 607 may also include a memory device, software, processing circuitry, or some other communication device. Remote control transceiver 607 may use IEEE 802.15.1, IEEE 802.15.4, or some other wireless communication format. In alternative configurations, infrared communications may be used instead of RF communications. Remote control transceiver 607 receives user instructions as described herein. Remote control transceiver 607 includes a remote control receiver and transmitter. In some configurations, the remote control receiver could be used without the transmitter, and in other configurations, the remote control receiver could be used with the transmitter.

Data network transceiver 608 comprises circuitry and interface components that communicate over a communication network, such as a telephone network, internet-protocol network, Ethernet network, wireless network, or the like. Data network transceiver 608 transfers data requests and receives user-selected data as described herein.

Video receiver 609 comprises circuitry and interface components that receive media from a satellite antenna, cable television feed, optical fiber link, Internet interface, or some other media transmission system. Video receiver 609 and data network transceiver 608 could be integrated together in some examples. Video transmitter 610 comprises circuitry and interface components that transfer video to a video presentation system, such as a television, computer, media player, or the like. Video transmitter 610 and video receiver 609 could be integrated together in some examples. Video receiver 609 receives video content and video transmitter 610 transfers video signals as described herein.

Circuitry 604 comprises microprocessors, video processing circuitry, power circuitry, communication lines, and possibly other circuitry, such as digital signal processors, communication circuitry, and digital video recorder circuitry. Circuitry 604 is typically mounted on one or more circuit boards that may also hold memory device 605 and portions of transceiver circuitry 603. Circuitry 604 retrieves and executes operating software 606 from memory device 605. Memory device 605 comprises a disk drive, flash drive, data storage circuitry, and/or some other memory apparatus. Operating software 606 comprises computer programs, firmware, or some other form of machine-readable processing instructions. Operating software 606 may include an operating system, utilities, drivers, network interfaces, applications, or some other type of software. When executed by circuitry 604, operating software 606 directs processing circuitry 602 to operate video control device 600 as described herein. In particular, operating software 606 directs processing circuitry 602 to provide a data/video integration menu, process user instructions, request user-selected data, and integrate the user-selected data and video content as described herein.

While several embodiments of the invention have been discussed herein, other implementations encompassed by the scope of the invention are possible. For example, while various embodiments have been described within the context of a television set-top box, other electronic devices, including, but not limited to, televisions, gaming consoles, DVRs, CD and DVD players, and computers, may benefit from application of the concepts explicated above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of operating circuitry in a video control system, the method comprising:
   transferring a first video signal to drive a display device to display a data/video integration menu, wherein the data/video integration menu is configured to permit user specification of user-selected data and specification of a position of display of the user-selected data relative to display of video content;
   receiving a user instruction corresponding to the displayed data/video integration menu, wherein the user instruction specifies the user-selected data and specifies display positioning information defining the display position of the user-selected data on the display;
   receiving the user-selected data in accordance with the user;
   receiving the video content;
   integrating the user-selected data and the video content into a second video signal that concurrently presents the integrated video content and the user-selected data in accordance with the specified position of the user-selected data relative to the video content; and
   transferring the second video signal to drive the display device, wherein the integrated video content and the user-selected data are presented on the display in accordance with the specified position of the user-selected data relative to the video content,
   wherein a screen size for the video content is reduced and the user-selected data is displayed in an open space left by the reduced screen size.

2. The method of claim 1, wherein the user-selected data is displayed in a crawl.

3. The method of claim 1, wherein the user instruction includes an instruction to block an information crawl in the video content, and wherein the second video signal drives the display device to display the integrated video content and user-selected data with the information crawl of the video content blocked.

4. The method of claim 1, wherein the user instruction is a first user instruction, and during the display of the integrated video content and user-selected data, the method further comprising:
   receiving a second user instruction to hide the user-selected data, and in response, transferring a third video signal to drive the display device to display the video content without the user-selected data.

5. The method of claim 4, wherein the screen size for the video content is increased.

6. The method of claim 4, further comprising:
   during the display of the integrated video content without the user-selected data, receiving a third user instruction to show the user-selected data; and
   transferring a fourth video signal, in response to receiving the third user instruction, to drive the display device, wherein the integrated video content and the user-selected data are presented on the display in accordance with the specified positions of the video content and the user-selected data, wherein the screen size for the video content is reduced and the user-selected data is displayed in the open space left by the reduced screen size.

7. The method of claim 1, wherein the user instruction is a first user instruction, and during the display of the integrated video content and user-selected data, the method further comprising:
   receiving a second user instruction to supplement the user-selected data;
   receiving the supplemental user-selected data to supplement at least some of the user-selected data with the supplemental user-selected data;
   integrating the user-selected data, the supplemental user-selected data and the video content into a third video signal; and
   transferring the third video signal to drive the display device, wherein the integrated video content, the user-selected data and the supplemental user-selected data are presented on the display, wherein the screen size for the video content is reduced, and wherein at least one of the user-selected data and the supplemental user-selected data is displayed in the open space left by the reduced screen size.

8. A video control system comprising:
   processing circuitry configured to form a first video signal to drive a display device to display a data/video integration menu, wherein the data/video integration menu is configured to permit user specification of user-selected data relative to a position of display of video content;
   video transmitter circuitry configured to transfer the first video signal to drive the display device; and
   transceiver circuitry configured to receive a user instruction corresponding to the displayed data/video integration menu, wherein the user instruction specifies the user-selected data and specifies display positioning information defining the display position of the user-selected data on the display,
   wherein the processing circuitry is further configured to form a second video signal to drive the display device, wherein the video content and the user-selected data are integrated in accordance with the specified positions of the video content and the user-selected data, wherein a screen size for the video content is reduced and the user-selected data is displayed in open space left by the reduced screen size, and
   wherein the video transmitter circuitry transfers the second video signal to drive the display device.

9. The video control system of claim 8, wherein at least some of the user-selected data is displayed in a crawl.

10. The video control system of claim 8, wherein the user instruction includes blocking an information crawl in the video content, and wherein the processing circuitry is configured to form the second video signal with the information crawl blocked in the video content.

11. The video control system of claim 8,
wherein the user instruction is a first user instruction,
wherein the transceiver circuitry is configured, during the display of the integrated video content and user-selected data, to receive a second user instruction to hide the user-selected data,
where in response to the second user instruction, the processing circuitry is further configured to form a third video signal that displays the video content without the user-selected data.

12. The video control system of claim 11,
wherein the processing circuitry is further configured to form the third video signal with an increased size of the video content.

13. The video control system of claim 8, wherein the user instruction is a first user instruction, and wherein the transceiver circuitry is configured, during the display of the integrated video content and user-selected data, to receive a second user instruction to modify the display positioning of the user-selected data, and in response, the processing circuitry is configured to form a third video signal to drive the display device to display the integrated video content and user-selected data with the user-selected data positioned relative to the video content according to the modified display positioning in the second user instruction.

14. A method of operating circuitry in a video control system, the method comprising:
transferring a first video signal to drive a display device to display a data/video integration menu, wherein the data/video integration menu is configured to permit user specification of user-selected data relative to a position of display of video content;
receiving one of a first user instruction and a second user instruction corresponding to the displayed data/video integration menu, wherein the first user instruction and the second user instruction specify the user-selected data, wherein the first user instruction specifies first display positioning information defining a first display position of the user-selected data on the display, and wherein the second user instruction specifies second display positioning information defining a second display position of the user-selected data on the display;
receiving the user-selected data in accordance with the user;
receiving the video content;
where in response to receiving the first user instruction, the method further comprises:
integrating the user-selected data and the video content into a second video signal that concurrently presents the video content and the user-selected data in accordance with the specified first display position of the user-selected data; and
transferring the second video signal to drive the display device, wherein the integrated video content and the user-selected data are presented on the display in accordance with the specified first display position of the user-selected data, and
wherein a screen size for the video content is reduced so that the user-selected data is displayed in an open space left by the reduced screen size; and
where in response to receiving the second user instruction, the method further comprises:
integrating the user-selected data and the video content into a third video signal that concurrently presents the video content and the user-selected data in accordance with the specified second display position of the user-selected data; and
transferring the third video signal to drive the display device, wherein the integrated video content and the user-selected data are presented on the display in accordance with the specified second display position of the user-selected data, and
wherein the user-selected data is presented over a corresponding portion of the video content in accordance with the specified second display position.

15. The method of claim 14, wherein the user-selected data is displayed over a blocked crawl of the video content in accordance with the specified second display position of the second user instruction.

16. The method of claim 14, wherein the user-selected data is displayed in a crawl.

17. The method of claim 14, wherein at least one of the first user instruction and the second user instruction includes an instruction to block an information crawl in the video content, and wherein the corresponding one of the second video signal and the third video signal drives the display device to display the integrated video content and user-selected data with the information crawl in the video content blocked.

18. The method of claim 14, wherein during the display of the integrated video content and user-selected data, the method further comprising:
receiving a third user instruction to hide the user-selected data; and
transferring, in response to the third user instruction, a fourth video signal to drive the display device to display the video content without the user-selected data.

19. The method of claim 14, wherein during the display of the integrated video content and user-selected data in accordance with the first user instruction, the method further comprising:
receiving the second user instruction, wherein the user-selected data is presented over a corresponding portion of the video content in accordance with the specified second display position in response to the second user instruction.

20. The method of claim 14, wherein during the display of the integrated video content and user-selected data in accordance with the second user instruction, the method further comprising:
receiving the first user instruction, wherein the screen size for the video content is reduced so that the user-selected data is displayed in the open space left by the reduced screen size in response to the first user instruction.

* * * * *